United States Patent [19]

Napier

[11] Patent Number: 4,619,830
[45] Date of Patent: Oct. 28, 1986

[54] BEVERAGE FILTER UNIT AND SUPPORT

[76] Inventor: Edward D. Napier, 45 Faraday Drive, Scarborough, Ontario, Canada, M1H 2R9

[21] Appl. No.: 637,001

[22] Filed: Aug. 2, 1984

[51] Int. Cl.[4] .......................... B65B 29/02; B30B 5/02
[52] U.S. Cl. ........................................ 426/82; 10/469; 10/474; 10/477; 206/0.5
[58] Field of Search ............... 210/469, 473, 474, 475, 210/477, 478, 479, 481; 426/77, 78, 81, 82, 83, 433; 99/279, 295, 323; 206/0.5, 45.14, 45.24; 220/90.2

[56] References Cited

U.S. PATENT DOCUMENTS

| | | | |
|---|---|---|---|
| 2,805,164 | 9/1957 | Doppler | 426/77 |
| 3,370,524 | 2/1968 | Kasakoff | 426/77 |
| 3,387,978 | 6/1968 | Major | 426/77 |
| 3,497,071 | 2/1970 | Mineo | 99/287 |
| 3,616,934 | 11/1971 | Ehrlich | 210/474 |
| 3,797,642 | 3/1974 | Dobry et al. | 210/474 |
| 3,971,305 | 7/1976 | Daswick | 206/0.5 |
| 4,020,532 | 5/1977 | Lichter | 210/469 |
| 4,141,997 | 2/1979 | Syroka et al. | 210/469 |
| 4,229,481 | 10/1980 | Fornari | 426/433 |
| 4,250,990 | 2/1981 | Casper | 426/80 |

*Primary Examiner*—Richard V. Fisher
*Assistant Examiner*—Wanda L. Millard
*Attorney, Agent, or Firm*—Ridout & Maybee

[57] ABSTRACT

A filter unit for making coffee, tea or other beverages consists of a filter pouch and a rod for suspending the pouch in a cup or similar container. The pouch has a water permeable bag portion in which ground coffee, tea or other beverage flavoring can be placed, and a mouth portion into which liquid can be poured to filter through the flavoring and through the permeable bag portion into the cup. The mouth portion is stiffer than the bag portion, being reinforced by folding the water permeable material of the pouch onto itself, and holes are pierced through the mouth portion to receive the rod. The rod passes through the holes midway between side edges of the pouch. The holes are slightly larger than the rod and the rod is smooth, and a pouch containing coffee or the like tends to open if the rod is jiggled. The side edges of the pouch diverge upwardly and can engage opposite sides of the cup to press the mouth portion to an open position as the pouch is lowered into the cup. The rod has a pair of smooth knobs which receive the rim of the cup between them to locate the rod transversely of the rim so that the rod supports the pouch in the cup. The pouch is easily dropped off the rod when the filter unit is removed from the cup.

10 Claims, 3 Drawing Figures

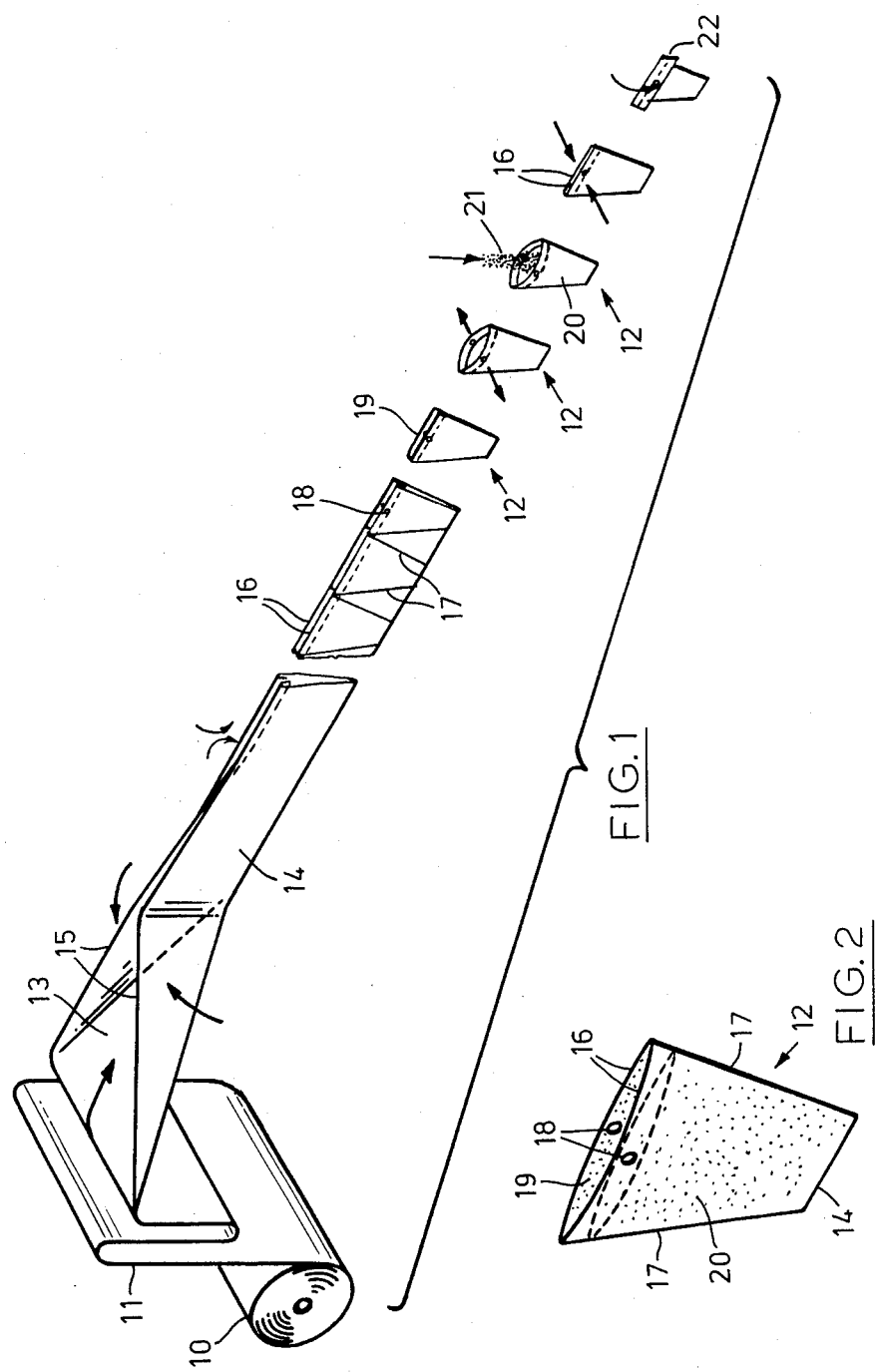

BEVERAGE FILTER UNIT AND SUPPORT

BACKGROUND OF THE INVENTION

1. Field of the Invention

This invention relates to a filter unit which is useful for making a small quantity, for example a cupful, of fresh coffee or other flavored beverage.

2. Description of the related art

It has been proposed heretofore to make coffee and other beverages by suspending, in a container, a filter bag which holds the desired flavoring, and pouring water through the bag whereby the water picks up flavoring and passes into the container.

In U.S. Pat. No. 3,616,934, dated Nov. 2, 1971, J. C. Ehrlich has proposed a bag made of two sheets of filter paper stitched together along their edges to form a bag having an open mouth portion, flaps of the sheets being folded outwardly at the mouth and stitched down to form open-ended channels which receive oppositely bowed arms of a wire holder. These bowed arms hold the mouth portion open, and the wire holder can span the rim of a pot or cup to suspend the bag therein, out of contact with the walls of the pot.

In U.S. Pat. No. 2,805,164, dated Sept. 3, 1957, R. A. Doppler discloses a more complex package of foil having a filter paper liner. A lower corner of the foil package can be torn off and the package can be opened to form a funnel that can be supported over a cup by means of a wire ring. The filter paper liner can hold ground coffee, and water poured into the funnel passes through the coffee on its way into the cup.

SUMMARY OF THE INVENTION

The present invention provides an economical filter unit that can be easily handled, without messiness, to make a fresh cup of coffee or other beverage. In accordance with the invention, the unit comprises a pouch having a water permeable bag portion and a mouth portion through which a rod is passed to extend across the mouth portion to suspend the pouch. The rod will lie on the rim of a cup. The mouth portion of the pouch is stiffer than the bag portion, being formed of filter material that is folded over and adhered to itself. To receive the rod, the mouth portion has aligned holes of larger diameter than the rod so that the pouch can easily be slid onto and can easily slide off the rod when the pouch has served its purpose. The pouch when empty lies flat, with the holes aligned midway between opposite side edges of the pouch, and these side edges, which are preferably fused by heat sealing of the pouch material, diverge upwardly. The rod is passed through the aligned holes, where it fits loosely. The weight of coffee or other flavoring within the pouch, and the smoothness of the loose-fitting rod, tends to cause the mouth portion to open, assisted if necessary by manually jiggling the rod. As the pouch is lowered into the cup, the upwardly divergent side edges of the pouch can engage opposite sides of the cup to assist in opening the mouth portion. The rod can support the pouch in the cup by resting on the rim of the cup transversely thereof, and the engagement of the side edges of the pouch with the sides of the cup tends to align the rod along a diameter of the cup.

To ensure that the rod rests securely on opposite sides of the rim of the cup, the rod is provided with a pair of smooth knobs which form between them a valley in which the cup rim is located, thereby positioning the rod on the cup. The knobs also serve as an easily gripped portion of the rod.

The invention also provides a method of making a fresh cup of coffee, and this and other features of the invention will become apparent from the following description of the preferred embodiment illustrated in the accompanying drawings.

BRIEF DESCRIPTION OF THE DRAWINGS

In the drawings,

FIG. 1 is a schematic illustration of the production of a series of filter pouches from a roll of filter material, including steps of filling the pouches with ground coffee and closing the pouches;

FIG. 2 shows an empty pouch; and

DESCRIPTION OF THE PREFERRED EMBODIMENT

Figure 3:
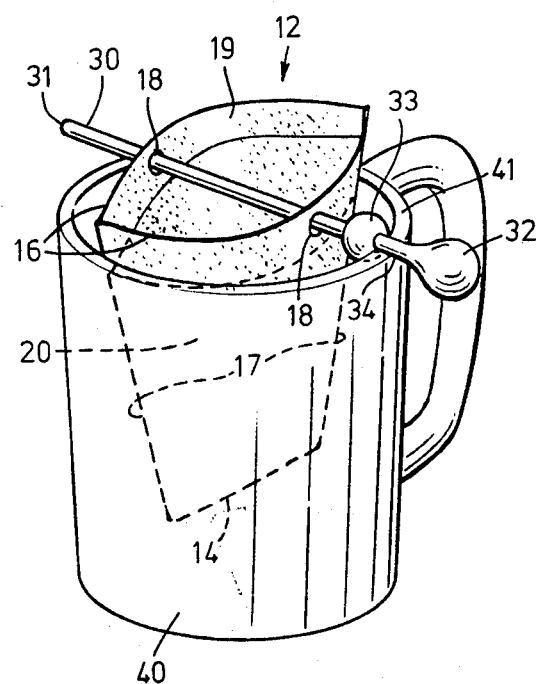
FIG. 3 shows how a pouch can be supported from the rim of a cup.

Referring to FIG. 1, a roll 10 of fabric 11 can be used to produce a series of filter pouches 12. The fabric can be the same as that which is used to make tea bags. It is porous so that water can easily filter through it, but flavoring materials such as ground coffee or tea will not. The fabric is coated at one side 13 with thermoplastic that is heat sealable. As the fabric passes through pouch-forming apparatus (which need not be illustrated because suitable apparatus can easily be obtained and is no part of the present invention), the fabric is first folded longitudinally at 14 and its free longitudinal margins 15 are folded inwardly against themselves and heat sealed together to form relatively stiff portions 16. Then the fabric is heat sealed transversely along upwardly divergent lines 17, and midway between the lines 17 the stiff portions 16 are perforated by aligned holes 18 (best seen in FIG. 2). The resultant double web of material is then die cut along the sealed lines 17 to form individual pouches 12. Each pouch 12 when empty lies flat and (as best seen in FIG. 2) has a bottom formed by the fold line 14, upwardly divergent sides formed by the sealed lines 17, and a mouth portion 19 consisting of the relatively stiff portions 16 that are perforated by the holes 18. Below the mouth portion 19 is a more readily permeable bag portion 20.

As shown in FIG. 1, if desired the mouth portion 19 of each pouch 12 can be opened by a pouch-making apparatus and be partially filled with flavoring, for example, ground roast coffee 21 sufficient to make one cup of liquid coffee. Then the mouth portion is closed by bringing its relatively stiff portions 16 together and folding them over, as at 22, to close the mouth portion. A plurality of such closed pouches can be packed into a box and sold with one or more rods 30, one of which is illustrated in FIG. 3. The stiffened portions 16 facilitate these opening, closing, and folding operations.

The rod 30 is cylindrical and of slightly smaller diameter than the holes 18 through the mouth portion of the pouch 12. The rod has a blunt, rounded end 31 for insertion through the aligned holes 18. At its opposite end it has a smooth teardrop-shaped knob 32, and spaced from the knob 32 is a further smooth, round bead or knob 33, the knobs 32 and 33 defining a valley 34 between them.

If, as in FIG. 1, a pouch 12 has been filled with ground roast coffee or the like, the folded over mouth portion can be unfolded to an upstanding position such as is illustrated in FIG. 2, and the rod 30 can be poked through the aligned holes 18 so that the pouch is suspended from the rod. Alternatively, an empty pouch, or a pouch freshly filled with coffee or the like, can be suspended from the rod by poking it through the aligned holes. The pouch is preferably filled with coffee or other flavoring before it is lowered into a cup or other container.

Holding the rod by its knobbed end, one may jiggle the rod, which fits loosely in the holes 18, and the jiggling (which overcomes friction between the mouth portion 19 and the rod), coupled with the weight of the coffee in the pouch, causes the mouth of the pouch to open, the relatively stiff portions 16 being slidable along the smooth rod. Still holding the rod by the knobbed end, and without touching the pouch, one may lower the pouch into a cup 40, and the upwardly divergent edges 17 of the pouch can engage the inner walls of the cup. The pressure thus exerted on the bag portion 20 of the pouch tends to cause the mouth portion 19 to open further by sliding along the smooth rod 30. This opening action will be assisted by the weight and outward pressure of coffee or other flavoring within the pouch. If the mouth portion is not sufficiently open to pour hot water or other liquid into the pouch, it can be further opened by inserting the tip of one's finger into the mouth portion to spread the portions 16 apart.

It is to be noted from FIG. 3 that the rod 30 is laid across the cup with the cup rim 41 located in the valley 34 of the rod. This positions the rod so that its other end 31 protrudes beyond the rim of the cup. Because the rod and its knobs 32, 33 are smooth, and the rod is of smaller diameter than the holes 18 in the pouch, the rod is free to locate itself longitudinally, with the valley 34 receiving the cup rim 41. The engagement of the edges 17 of the pouch with the cup walls centers the rod 30 along a diameter of the cup.

The relative stiffness of the mouth portion, formed by the folded over and adhered portions 16, provides rigidity that assists sliding of the mouth portion along the rod, and resists sagging of the mouth portion so that it does not tend to bind on the rod nor slump into the cup when suspended as shown in FIG. 3.

If the pouch does not contain ground coffee or the like before it is lowered into a cup, such flavoring matter can be poured into the pouch, and then water can be poured to filter through the flavoring and through the bag portion 20 into the cup 40. The rod 30, extending across the mouth, can intercept some of the poured liquid and disperse it over the contents of the pouch, with some agitation of the flavoring to facilitate mixing with the liquid. The fact that the stream of poured water can be broken and diverted by the rod helps to reduce channelling of water through the flavoring. The rod is preferably made of a plastic material so that it imparts no taste to the beverage.

The water poured into the pouch creates pressure within the pouch that helps to ensure that the mouth portion is not caused to close as the cup fills with liquid. The relatively stiff portions 16 resist crumpling inwardly as hot water is poured. The mouth portion of the cup forms an approximate oval when viewed from above the cup. This leaves open to view part of the level of liquid in the cup, so that by observing this liquid level one can avoid overfilling the cup.

An excellent material for the pouch is a tea bag material made of manila hemp and wood binder, with a polyvinyl coating on one side. The preferred material has a porosity which allows 750 to 900 liters of air to pass through the material per minute per 100 square centimeters at a pressure of 12.7 millimeters of water. A pouch of such material has, suitably, the following dimensions when lying flat. The bottom 14 of the pouch is approximately 50 millimeters long, between the edges 17. Parallel to this, the top is approximately 97 millimeters long between these edges 17. The vertical depth of the pouch is approximately 85 millimeters. At the edges 17, the material of the pouch is adhered to itself along strips approximately 4 millimeters wide, and the folded over portions 16 are approximately 10 millimeters deep. Excluding the areas where the material is adhered to itself this provides a total filtering area of about 9500 square millimeters. To make a cup of coffee, such a pouch is filled about two-thirds full with ground roast coffee, i.e. with the equivalent of about eight level teaspoons of coffee (about 40 milliliters, of ground coffee), though slightly less than this is preferred for so-called high yield coffee. For manual filter drip grinds of coffee, and for extra fine grinds, particularly high yield coffees, the porous manila hemp material referred to above tends to become obstructed, restricting the flow of liquid into the cup, whereby time is allowed for water to be absorbed into the grounds in order for the extraction process to proceed. If the coffee is too coarsely ground, e.g., regular grind, it is found that the water will run too fast through the coffee and pouch. The procedure, in pouring hot water (200° to 205° Fahrenheit) into the pouch, is first to pour in enough water to cover the coffee grounds completely, in the pouch, and allow this water to drain into the cup. This first step takes about fifteen seconds, and dampens the grounds for more rapid subsequent extraction of flavor. Then hot water is poured continuously and slowly into the pouch, over a period of about thirty seconds, maintaining the liquid level in the pouch close to the top of the pouch. Fresh ground roast coffee tends to float to the surface of the water in the pouch, but the continuous pouring of additional water into the pouch agitates the coffee grounds to provide excellent mixing of the ground coffee and the water to assist the extraction process from all the coffee grounds. During this thirty second period a higher level of liquid is maintained in the pouch than in the cup so that forced filtration continues. When the desired level of liquid is obtained in the cup, and is the same as that in the pouch, the filtering process stops but there is some steeping occurring within the pouch.

After sufficient water has been poured into the pouch over the period of about thirty seconds, the rod 30 can be grasped by its knobs and the pouch can be lifted out of the cup. The pouch is held over the cup for about fifteen seconds to allow liquid remaining in it to drain into the cup. Here the downward taper of the pouch is of further advantage, because the liquid draining from the pouch tends to be funnelled into the cup. The pouch has a double downward taper, namely, that formed by the edges 17 and, transversely thereto, that formed between the holes 18 and the bottom of the pouch. Once the remaining liquid has drained into the cup, the person holding the rod 30 by its knobs can dispose of the pouch by tilting the rod 30 so that the pouch slides off the end 31 of the rod and into a waste receptacle, with no need to touch a very hot, damp, messy pouch. The rod can be used as a stirrer.

As a result of the foregoing procedure there is preferably extracted about 19% of the weight of the coffee, leaving about 1.25% soluble solids in the brew. A total of about eight ounces of water has been used. A stronger brew can be obtained by using more coffee or less water, or by leaving the pouch in the cup for a little longer for further steeping, because the full pouch contains about 25% of the total amount of brew. Weaker brew can be obtained by adding hot water to the regular strength brew.

Although, as described with reference to FIG. 1, the pouches can be sold with flavoring already in them, it is presently preferred to provide the householder with a package of flat, empty pouches and one or more rods 30, so that the householder can separately supply the desired flavoring, for example, freshly ground roast coffee. Empty pouches and rods can be stored in most coffee cans or other containers, and can be supplied in such containers by vendors of coffee.

Because individual cups of coffee can be made in a simple, fast, convenient, clean and economical manner, with no skill, and without mess, a host may offer to his guests their individual choices of different kinds or blends of coffee, rather than serving everyone from the same coffee pot.

Variations of the preferred embodiment will no doubt occur to those skilled in the art and are intended to be included within the scope of the following claims.

I claim:

1. A filter unit comprising a pouch having a mouth portion and a water permeable bag portion, said bag portion having opposing sides defined by a bottom fold line and opposing edges extending upwardly from the fold line to the mouth portion, and a smooth, straight rod insertable through the pouch transversely through and across the mouth portion substantially perpendicular to the fold line for suspending the pouch when the rod is rested across the rim of a cup.

2. A unit as claimed in claim 1, wherein the pouch has opposed holes in its mouth portion for receiving the rod, and the rod fits loosely in said holes whereby the pouch can slide on the rod.

3. A unit as claimed in claim 2, wherein the mouth portion having the rod-receiving holes is stiffer than the bag portion to resist slumping of the pouch when suspended on the rod.

4. A unit as claimed in claim 3, wherein the pouch comprises a unitary sheet of water permeable material joined to itself along opposite side edges of the pouch and folded against and joined to itself to form the mouth portion of the pouch.

5. A unit as claimed in claim 4, wherein the pouch when empty lies flat and its opposite side edges diverge upwardly to the mouth portion, the divergent edges being adapted, when the pouch is lowered on the rod into the cup, to engage opposite sides of the cup thereby to urge the mouth portion to open.

6. A unit as claimed in claim 5, wherein the rod has a peripheral valley for receiving said rim.

7. A unit as claimed in claim 6, wherein the valley is formed between a pair of smooth knobs on the rod.

8. A filter unit that can be suspended in a cup, comprising a water permeable pouch for retention of ground coffee, tea or other beverage flavoring, the pouch when empty lying flat and having a bottom fold line and opposite side edges which diverge upwardly to a mouth portion of the pouch, the divergent edges being adapted, when the pouch is lowered into the cup, to engage opposite sides of the cup thereby to urge the mouth portion to open, and a rod insertable through the pouch transversely across its mouth portion midway between said side edges substantially perpendicular to the fold line and adapted to rest transversely of the rim of the cup to support the pouch in the cup.

9. A unit as claimed in claim 8, wherein the mouth portion is stiffer than the remainder of the pouch and has opposed holes for receiving the rod, and the rod fits loosely in said holes whereby the pouch slides easily on the rod.

10. A unit as claimed in claim 9, wherein the pouch contains ground coffee and the mouth portion is folded over to hold the coffee in the pouch.

* * * * *